Dec. 8, 1931.  R. SPARR  1,835,576
TELESCOPIC RIFLE SIGHT MOUNTING
Filed April 26, 1930
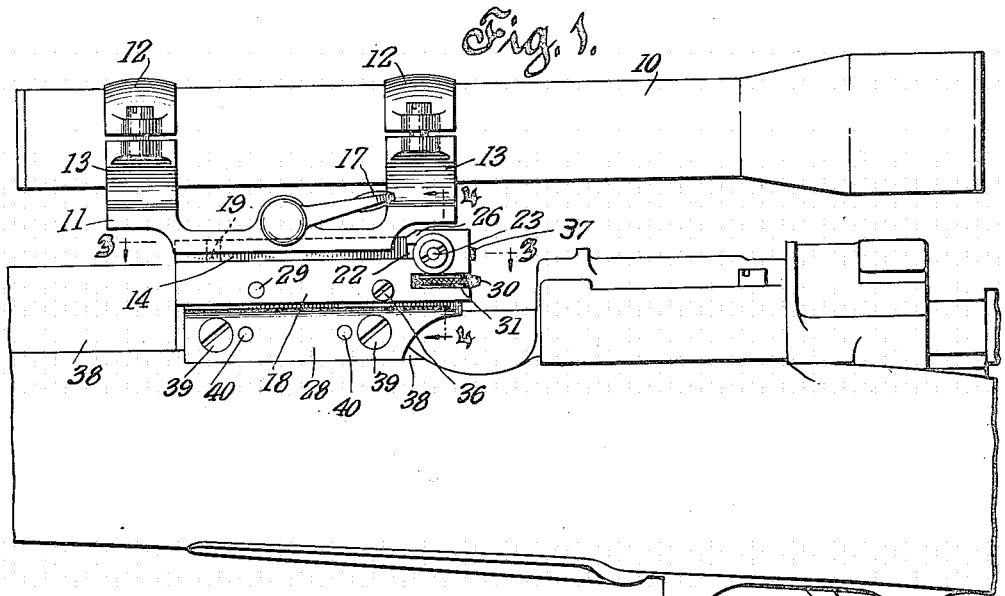
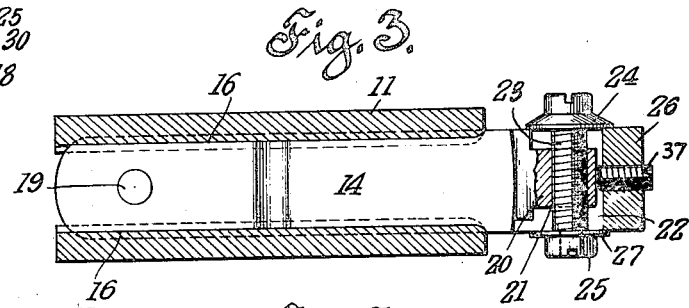
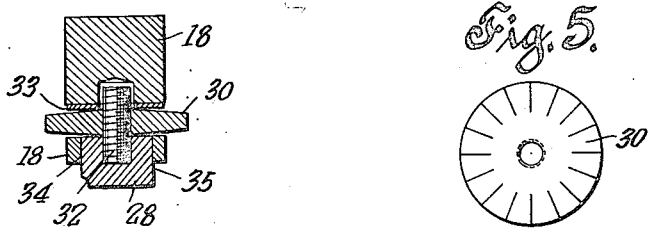
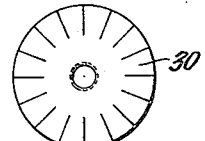
INVENTOR
Robert Sparr
BY
Mitchell & Bechert
ATTORNEY Patented Dec. 8, 1931

1,835,576

UNITED STATES PATENT OFFICE

ROBERT SPARR, OF NEW YORK, N. Y., ASSIGNOR TO ABERCROMBIE & FITCH COMPANY, OF NEW YORK, N. Y., A CORPORATION OF NEW YORK

TELESCOPIC RIFLE SIGHT MOUNTING

Application filed April 26, 1930. Serial No. 447,476.

My invention relates to a telescopic rifle sight mounting and more particularly to means for making elevation and deflection adjustments in the fixed base of such mounting which is permanently attached to a rifle.

Telescopic rifle sights usually contain movable cross wires within the telescope tube and exterior means are provided for moving such cross wires. By means of these cross wires adjustments may be made for range, wind, drift, and weight of charge. The object of such adjustment is to cause the line of sight and the trajectory of the bullet to intersect at the target. Corrections for wind and drift, which are known as deflection corrections, are made by positioning the line of sight so that the vertical plane through the line of sight and the vertical plane through the axis of the bore make a horizontal angle with each other. Corrections for range and weight of charge, which are known as elevation corrections, are made by positioning the line of sight so that it makes a smaller angle with the horizontal than does the axis of the bore. The line of sight can be shifted with respect to the axis of the bore either by means of moving the cross wires within the telescope tube or by rotating the entire telescope about horizontal and vertical axes. When the telescope is rotated so as to correct for wind and drift it is said to be rotated in azimuth. When the telescope is rotated so as to correct for weight of charge and for range, it is said to be rotated in elevation.

Telescopes embodying cross wires and exterior adjusting means for such wires are necessarily expensive, and this is so even if only elevation adjustments are provided for within the telescope tube. The telescope is usually removable from the rifle, and with the devices in common use in which the adjustment means are within the telescope or are outside the telescope but permanently attached thereto, it is of course necessary to make the necessary adjustments all over again when the telescope is used with a different rifle.

It is the principal object of the present invention to provide an exceedingly compact and sturdy telescopic rifle sight mounting which includes a base which provides means for adjustment in both elevation and deflection, such base remaining permanently attached to the rifle in an out of the way position and being adapted for use with a simple form of telescope which is removable and which does not embody internal or external means for adjustment in elevation or deflection.

Briefly stated, I provide a base to be permanently attached to a rifle. The base has self contained means for making deflection and elevation corrections. The telescope support is readily attachable to and detachable from this base.

The advantages of this entirely new combination are two-fold. First, it merely requires a simple form of telescope and does not require a telescope containing movable cross wires or similar devices. Second, as many bases as needed may be put on as many rifles as are wanted and the telescope can be used interchangeably and with satisfactory results with all the rifles thus equipped.

In the drawings which show, for illustrative purposes only, a preferred form of the invention—

Fig. 1 is a broken side view of a rifle equipped with a telescopic sight secured by my improved mounting;

Fig. 2 is an end view of the telescopic rifle sight mounting viewed from the muzzle end of the rifle;

Fig. 3 is a horizontal section of the telescopic sight mounting taken upon the plane of the line 3—3 in Fig. 1, parts being omitted for the sake of clarity;

Fig. 4 is a vertical section of the base of the telescopic sight mounting taken upon the plane of the line 4—4 in Fig. 1, parts being omitted for the sake of clarity;

Fig. 5 is a top view of the elevation nut.

In said illustrative drawings, 10 indicates a telescope which is provided with interior cross wires or other means by which the image of an object can be centered at the optical axis of the telescope. 11 indicates a telescope support or saddle which is adapted to be permanently attached to the telescope 10. In the form shown in the drawings the telescope support 11 is attached to the telescope 10 by means of the spaced clamps 12, 13 which completely encircle the telescope and which parts are offset laterally from the saddle as shown in Fig. 2. The telescope support 11 is removably mounted on a base which is permanently attached in a fore and aft position to the side of the rifle and which comprises all the remaining parts of the sight mounting. The part of the base to which the telescope support or saddle 11 is directly but removably attached is the mounting member 14.

In the form shown in the drawings the telescope support 11 is attached to the mounting member 14 by means of a dovetail 15 on the mounting member 14 which fits within the dovetailed slide 16 of the telescope support 11. The telescope support 11 is held securely in position on the mounting member 14 by means of a suitable catch or clamping device. A thumb lever 17 is provided for operating such catch or clamping device.

The mounting member 14 is pivotally connected near its front end to the cradle 18 by means of a vertical fulcrum pin 19. Means are provided for turning the telescope horizontally on the fulcrum pin 19 for drift and wind corrections. For instance, in the form shown in the drawings the mounting member 14 has a rearwardly projecting lug 20 which has a threaded horizontal bore 21. The lug 20 extends into the horizontal slot 22 in the cradle 18 and is closely embraced between the horizontal surfaces of this slot. The deflection screw 23 in the threaded bore 21 is held against longitudinal motion preferably by means of an enlarged head 24 and a nut 25 which bear against opposite sides of a lug 26 at the rear end of the cradle 18. When the deflection screw 23 is rotated, the telescope is turned on the fulcrum pin 19. The deflection screw 23 is provided with means such as a spring washer 27 to permit a slight angular movement of the mounting member 14 about the fulcrum pin 19. The micrometer head 24 of the deflection screw 23 may be graduated so as to permit setting the same at the position desired, and an index mark is engraved upon the cradle 18 when the rifle is targeted with the telescopic sight. Means are provided for adjusting the deflection screw 23. In the form shown the end is slotted to receive a screw-driver.

The cradle 18 supports the mounting member 14 and is hinged near its front end to the bracket 28 by means of the horizontal hinge pin 29. Means are provided for rotating the cradle about the hinge pin 29, thus giving the telescope the proper depression angle for range correction. For instance, in the form shown in the drawings, the elevation nut 30 is seated in a slot 31 in the rear end of the cradle 18 and engages a screw 32 fixed to the bracket 28. When the elevation nut 30 is turned, the telescope is rotated about the hinge pin 29. The elevation nut 30 is provided with means such as a spring washer 33 to take up play between the elevation nut 30 and the cradle 18. The top surface of the nut may be graduated micrometrically so as to permit setting the nut in any desired position and an index mark is placed on the rear end of the cradle 18 at the time the rifle is targeted with the telescopic sight.

The lower surface of the cradle 18 may contain a recess 34 for receiving the upper part of the bracket 28, and the sides 35 of the upper part of the bracket 28 may be formed so as to be a snug fit in the recess 34.

The cradle 18 may be provided with clamping means such as a set screw 36, by means of which the cradle may be firmly clamped to the bracket 28, and it may also be provided with other clamping means such as a set screw 37 for securely clamping the mounting member 14 to the cradle 18.

The bracket 28 and the parts permanently carried thereby are secured to a rifle, preferably at the side of the receiver 38 thereof so as not to interfere with sighting the rifle when the telescope is removed. A preferred form of attachment is by means of the screws 39 and pins 40.

The method of using this telescopic rifle sight mounting is as follows:

The bracket 28 is permanently attached to the rifle with which it is to be used. The other parts are assembled thereon and the removable telescope support to which has been permanently attached a suitable telescope is put in place. The rifle is then targeted with the charge which will commonly be used and at the range at which it will usually be fired. In the course of such targeting, the elevation nut and the deflection screw will be rotated so as to cause the line of sight and the trajectory of the bullet to intersect at the target. When this has been done index marks are engraved for the deflection and elevation micrometer scales and zero marks are placed on such micrometer scales. The screws 36, 37 for clamping the cradle and the mounting member are then tightened. Thereafter when it is desired to shoot the rifle with a different charge or at a different range from those at which it has been targeted, the set screws 36, 37 are loosened and the necessary corrections are made by means of the elevation and deflection micrometers.

By operating the thumb lever 17 the telescope and telescope support can be instantly removed from the base and used with another rifle. If several rifles have been provided with telescope bases, as herein disclosed, and targeted, the telescope can be instantly attached to any one of them and used without further adjustment.

It will be seen that I have provided a very simple and effective telescopic rifle sight mounting which is of sturdy construction and not likely to get out of order. It does not require the use of the expensive type of telescope which has movable cross wires or similar devices. After the bases have been placed on a number of rifles and the rifles have been targeted, the same telescope can be used interchangeably with all the rifles without further adjustments.

I claim:

1. A telescopic sight mounting for a portable rifle comprising a bracket with means for permanently connecting the same in a fore and aft position on the side of said rifle, a fore and aft mounting permanently carried by said bracket including a lower and an upper part respectively pivoted about normally horizontal and vertical axes adjacent their forward ends to permit the upper part of said mounting to be angularly adjusted for deflection and for elevation, said lower part being carried by said bracket and said upper part being carried by said lower part, and a telescope-supporting saddle detachably connected to said upper part.

2. A telescopic sight mounting for a portable rifle comprising a bracket with means for permanently connecting the same in a fore and aft position on the side of the rifle, a fore and aft mounting including a lower part hinged to said bracket adjacent its forward end on a horizontal axis, with means for rocking said part on said axis, an upper part mounted adjacent its forward end on said first part on a vertical axis, with means for rocking said second part on said axis, with a telescope supporting saddle detachably connected to said upper part.

3. A telescopic sight mounting for a portable rifle comprising a bracket with means for permanently securing the same in a fore and aft position on the side of the rifle, a mounting including a lower part hinged adjacent its forward end in a fore and aft position on said bracket on a horizontal axis, with means for rocking said part on said axis, an upper part mounted on said lower part in a fore and aft position on a vertical axis, with means at the rear for rocking said second part on said axis, with a telescope supporting saddle removably mounted on said upper part, said saddle being offset laterally to position said telescope directly above the barrel of said rifle.

4. A telescopic sight mounting for a portable rifle comprising, a bracket, means for permanently connecting the same to the side of a rifle in a fore and aft position, an adjustable fore and aft mounting carried on said bracket and including a lower part and an upper part respectively pivoted about horizontal and vertical axes to permit said upper part of said mounting to be angularly adjusted for both elevation and deflection, said lower part being carried directly by said bracket and said upper part being carried directly by said lower part, means for holding the movable parts of said mounting in various positions of adjustment on said axes, and a telescope supporting saddle detachably connected to said upper part of said mounting.

ROBERT SPARR.